United States Patent
Ayyadevara et al.

(10) Patent No.: US 11,227,153 B2
(45) Date of Patent: Jan. 18, 2022

(54) AUTOMATED SYSTEMS AND METHODS FOR IDENTIFYING FIELDS AND REGIONS OF INTEREST WITHIN A DOCUMENT IMAGE

(71) Applicant: Optum Technology, Inc., Eden Prairie, MN (US)

(72) Inventors: V Kishore Ayyadevara, Hyderabad (IN); Nilav Baran Ghosh, Hyderabad (IN); Yeshwanth Reddy, Hyderabad (IN); Vineet Shukla, Bangalore (IN); Kartik Chaudhary, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 79 days.

(21) Appl. No.: 16/710,901

(22) Filed: Dec. 11, 2019

(65) Prior Publication Data
US 2021/0182547 A1    Jun. 17, 2021

(51) Int. Cl.
*G06K 9/00* (2006.01)
*G06K 9/62* (2006.01)
*G06K 9/32* (2006.01)

(52) U.S. Cl.
CPC ......... *G06K 9/00449* (2013.01); *G06K 9/325* (2013.01); *G06K 9/6201* (2013.01); *G06K 9/6256* (2013.01); *G06K 2209/01* (2013.01)

(58) Field of Classification Search
CPC .. G06K 9/00449; G06K 9/6256; G06K 9/325; G06K 9/6201; G06K 2209/01
See application file for complete search history.

(56) References Cited

U.S. PATENT DOCUMENTS

| | | | |
|---|---|---|---|
| 5,228,100 A | 7/1993 | Takeda et al. |
| 5,276,771 A | 1/1994 | Manukian et al. |
| 5,664,109 A | 9/1997 | Johnson et al. |
| 6,658,166 B1 | 12/2003 | Zlotnick et al. |
| 7,756,332 B2 | 7/2010 | Jager |
| 8,064,700 B2 | 11/2011 | King et al. |
| 8,077,976 B2 | 12/2011 | Shiiyama |
| 8,321,357 B2 | 11/2012 | Lapir et al. |
| 8,954,845 B2 | 2/2015 | Misawa et al. |

(Continued)

OTHER PUBLICATIONS

NonFinal Office Action for U.S. Appl. No. 16/710,854, dated Apr. 12, 2021, (16 pages), United States Patent and Trademark Office, USA.

(Continued)

*Primary Examiner* — Ming Y Hon
(74) *Attorney, Agent, or Firm* — Alston & Bird LLP

(57) ABSTRACT

Systems and methods are configured to extract text from images (e.g., document images) utilizing a combination of optical character recognition processes and neural network-based analysis of various images to train a machine-learning object recognition model that is configured to identify text within images based on object-comparisons between known and unknown text within images. In certain embodiments, identified text within images may be utilized to identify corresponding regions-of-interest for extraction of image data encompassing a portion of an image that may be indexed based at least in part on text identified as corresponding to the particular region-of-interest.

18 Claims, 18 Drawing Sheets

(56) References Cited

U.S. PATENT DOCUMENTS

| | | | |
|---|---|---|---|
| 9,113,076 B2 | 8/2015 | King et al. | |
| 9,280,525 B2 | 3/2016 | Olszewski et al. | |
| 9,361,531 B2 | 6/2016 | Stella | |
| 9,418,315 B1 | 8/2016 | Keogh et al. | |
| 9,754,187 B2* | 9/2017 | Panferov | G06K 9/00483 |
| 9,910,842 B2 | 3/2018 | Hu | |
| 10,127,673 B1* | 11/2018 | Ben Khalifa | G06K 9/00463 |
| 10,331,950 B1* | 6/2019 | Suriyanarayanan | G06N 5/003 |
| 10,467,464 B2* | 11/2019 | Chen | G06K 9/00449 |
| 10,878,234 B1 | 12/2020 | Adam et al. | |
| 2002/0037097 A1* | 3/2002 | Hoyos | G06K 9/00463 382/137 |
| 2003/0028401 A1 | 2/2003 | Kaufman et al. | |
| 2005/0289182 A1 | 12/2005 | Pandian et al. | |
| 2007/0089049 A1* | 4/2007 | Gormish | G06F 40/166 715/224 |
| 2007/0168382 A1* | 7/2007 | Tillberg | G06K 9/00449 |
| 2007/0204001 A1* | 8/2007 | Hoopes | G06F 16/902 709/217 |
| 2008/0063276 A1* | 3/2008 | Vincent | G06K 9/6218 382/182 |
| 2008/0118112 A1* | 5/2008 | Gotoh | G06K 9/00442 382/112 |
| 2009/0094059 A1 | 4/2009 | Coleman et al. | |
| 2009/0180698 A1 | 7/2009 | Ramani et al. | |
| 2011/0255794 A1 | 10/2011 | Neogi et al. | |
| 2011/0280477 A1* | 11/2011 | Al-Omari | G06K 9/342 382/165 |
| 2012/0177290 A1 | 7/2012 | Le et al. | |
| 2013/0036111 A2 | 2/2013 | Kramer et al. | |
| 2014/0108423 A1* | 4/2014 | Casella dos Santos | G06F 16/285 707/748 |
| 2014/0241631 A1* | 8/2014 | Huang | G06K 9/00463 382/176 |
| 2015/0205846 A1* | 7/2015 | Aldridge | G06F 7/06 707/602 |
| 2017/0147552 A1 | 5/2017 | Carroll | |
| 2017/0147650 A1* | 5/2017 | Hattori | H04L 67/02 |
| 2017/0330030 A1 | 11/2017 | Kalyuzhny | |
| 2017/0344821 A1 | 11/2017 | Gaskill et al. | |
| 2017/0351913 A1 | 12/2017 | Chen et al. | |
| 2018/0025222 A1 | 1/2018 | Yellapragada et al. | |
| 2018/0033147 A1 | 2/2018 | Becker et al. | |
| 2018/0101791 A1* | 4/2018 | Viswanathan | G06N 20/00 |
| 2019/0043146 A1* | 2/2019 | Bliwas | G06K 9/00456 |
| 2019/0087395 A1* | 3/2019 | Priestas | G06F 40/169 |
| 2019/0188835 A1* | 6/2019 | Loginov | G06T 5/002 |
| 2019/0266431 A1* | 8/2019 | Tallman | G06T 11/20 |
| 2019/0354720 A1* | 11/2019 | Tucker | G06N 5/02 |
| 2020/0074169 A1 | 3/2020 | Mukhopadhyay et al. | |
| 2020/0097711 A1* | 3/2020 | Venkateswaran | G06K 9/00456 |
| 2020/0110932 A1* | 4/2020 | Berger | G07D 7/206 |
| 2020/0327172 A1* | 10/2020 | Coquard | G06F 16/9035 |
| 2020/0410231 A1 | 12/2020 | Chua et al. | |
| 2021/0064908 A1* | 3/2021 | Semenov | G06K 9/00456 |

OTHER PUBLICATIONS

Kodgire, Swati Vikas et al. "A Review On Optical Character Recognition and Text to Speech Conversion," International Journal of Science and Research (IJSR), vol. 5, Issue 6, Jun. 2016, pp. 1964-1970. [Retrieved from the Internet Dec. 30, 2019] <https://www.ijsr.net/archive/v5i6/NOV164524.pdf>.

Mandal, Ranju et al. "Multi-Lingual Date Field Extraction For Automatic Document Retrieval By Machine," Information Sciences, vol. 314, Sep. 1, 2015, (25 pages).

United States Patent and Trademark Office, Notice of Allowance for U.S. Appl. No. 14/724,959, dated Sep. 5, 2019, (11 pages), USA.

Notice Of Allowance and Fee(s) Due for U.S. Appl. No. 16/710,854, dated Aug. 24, 2021, (14 pages), United States Patent and Trademark Office, USA.

Supplemental Notice of Allowability for U.S. Appl. No. 16/710,854, dated Sep. 27, 2021, (9 pages), United States Patent and Trademark Office, USA.

* cited by examiner

| Member Name: | Sindhura |

FIG. 4

| Member Name: | Sindhura | | |
|---|---|---|---|
| Insurance ID#: | 36998743287 | | |
| Date of Birth: | 12/08/79 | | |
| Street Address: | 274 Jennifer Ave | | |
| City: Jubilee Hills | State: NJ | | Zip: 50083 |
| Phone: 8790988001 | | | |

| string | confidence | fname | x | y | w | h |
|---|---|---|---|---|---|---|
| medication name | 0.99 | XML5B55F1E3A7D8.TIF_page004.tif | 99 | 686 | 198 | 19 |
| provider name | 0.99 | XML5B56D647B298.TIF_page002.tif | 921 | 319 | 174 | 23 |
| member name | 0.99 | XML5B56D647B298.TIF_page002.tif | 150 | 316 | 169 | 23 |
| provider name | 0.99 | XML5B56D33EBF19.TIF_page009.tif | 889 | 310 | 171 | 17 |
| medication name | 0.99 | XML5B56D33EBF19.TIF_page009.tif | 100 | 661 | 198 | 16 |
| medication name | 0.99 | XML5BA3515B981A.TIF_page000.tif | 142 | 689 | 193 | 18 |
| provider name | 0.99 | XML5B96920CC63B.TIF_page009.tif | 758 | 355 | 172 | 17 |
| member name | 0.99 | XML5B96920CC63B.TIF_page009.tif | 48 | 355 | 171 | 17 |
| medication name | 0.99 | XML5B96920CC63B.TIF_page009.tif | 190 | 1033 | 252 | 18 |

AUTOMATED SYSTEMS AND METHODS FOR IDENTIFYING FIELDS AND REGIONS OF INTEREST WITHIN A DOCUMENT IMAGE

TECHNOLOGICAL FIELD

Embodiments of the present invention generally relate to systems and methods for automatically identifying fields-of-interest and/or regions-of-interest within a document image.

BACKGROUND

Optical Character Recognition (OCR) systems and methods are generally unsuitable for use with document images characterized by poor image quality, and/or document images of hand-filled forms. Existing OCR systems and methods are generally characterized by poor text recognition, either by identifying text incorrectly or failing to recognize certain text at all. Thus, existing OCR systems are generally unsuitable for entirely unsupervised operation, thereby requiring a significant amount of user input in addition to significant amounts of computing resources for executing OCR processes.

Various embodiments have remedied identified deficiencies of existing OCR systems and methods through applied effort and ingenuity.

BRIEF SUMMARY

In general, embodiments of the present invention provide methods, apparatus, systems, computing devices, computing entities, and/or the like. In accordance with one embodiment, a computer-implemented method for extracting textual data within a field-of-interest from an image is provided. The method of certain embodiments comprises: identifying, within each of a plurality of images, one or more connected components; extracting matching text from a first plurality of connected components comprising at least one of the one or more connected components identified within each of the plurality of images via optical character recognition (OCR); identifying, based on a vector representation comparison between the one or more connected components identified within each of the plurality of images, a second plurality of connected components matching at least one of the first plurality of connected components; and extracting matching text from the second plurality of connected components based at least in part on matches with the at least one of the first plurality of connected components.

In various embodiments, the method further comprises training an object detection model with the first plurality of connected components and the second plurality of connected components; identifying, via the object detection model, a plurality of fields matching at least one of the first plurality of connected components or the second plurality of connected components; and extracting matching text from the plurality of fields based at least in part on matches with the at least one of the first plurality of connected components or the second plurality of connected components. Moreover, training an object detection model comprises supervised training. In certain embodiments, identifying a second plurality of connected components comprises: generating, via a neural network, a vector representation of each of the one or more connected components identified within each of the plurality of images; identifying a match between a vector representation of the second plurality of connected components with a vector representation of the first plurality of connected components; and associate the matching text of the first plurality of connected components with the second plurality of connected components. In certain embodiments, identifying a match between a vector representation of the second plurality of connected components with a vector representation of the first plurality of connected components comprises: determining a correlation between the vector representation of the first plurality of connected components and others of the one or more connected components identified within the plurality of images; and identifying the second plurality of connected components based on a determination that the vector representation of the second plurality of connected components satisfies a correlation criterion with the first plurality of connected components.

In certain embodiments, the method comprises comparing the extracted matching text against one or more field names of a field-of-interest; and identifying one or more connected components having extracted matching text corresponding to the one or more field names. Moreover, in various embodiments, the method further comprises: identifying a region of interest having corresponding connected components having extracted matching text corresponding to the one or more field names; and extracting image data corresponding to the region of interest.

Certain embodiments are directed to a computing system comprising a non-transitory computer readable storage medium and one or more processors, the computing system configured to: identify, within each of a plurality of images, one or more connected components; extract matching text from a first plurality of connected components comprising at least one of the one or more connected components identified within each of the plurality of images via optical character recognition (OCR); identify, based on a vector representation comparison between the one or more connected components identified within each of the plurality of images, a second plurality of connected components matching at least one of the first plurality of connected components; and extract matching text from the second plurality of connected components based at least in part on matches with the at least one of the first plurality of connected components.

In certain embodiments, the computing system is further configured to: train an object detection model with the first plurality of connected components and the second plurality of connected components; identify, via the object detection model, a plurality of fields matching at least one of the first plurality of connected components or the second plurality of connected components; and extract matching text from the plurality of fields based at least in part on matches with the at least one of the first plurality of connected components or the second plurality of connected components. In certain embodiments, training an object detection model comprises supervised training. Moreover, identifying a second plurality of connected components may comprise: generating, via a neural network, a vector representation of each of the one or more connected components identified within each of the plurality of images; identifying a match between a vector representation of the second plurality of connected components with a vector representation of the first plurality of connected components; and associate the matching text of the first plurality of connected components with the second plurality of connected components.

In certain embodiments, identifying a match between a vector representation of the second plurality of connected components with a vector representation of the first plurality of connected components comprises: determining a correlation between the vector representation of the first plurality of connected components and others of the one or more connected components identified within the plurality of images; and identifying the second plurality of connected components based on a determination that the vector representation of the second plurality of connected components satisfies a correlation criterion with the first plurality of connected components.

In various embodiments, the computing system is further configured to: compare the extracted matching text against one or more field names of a field-of-interest; and identify one or more connected components having extracted matching text corresponding to the one or more field names.

According to various embodiments, the computing system is further configured to: identify a region of interest having corresponding connected components having extracted matching text corresponding to the one or more field names; and extract image data corresponding to the region of interest.

Certain embodiments are directed to a computer program product comprising a non-transitory computer readable medium having computer program instructions stored therein, the computer program instructions when executed by a processor, cause the processor to: identify, within each of a plurality of images, one or more connected components; extract matching text from a first plurality of connected components comprising at least one of the one or more connected components identified within each of the plurality of images via optical character recognition (OCR); identify, based on a vector representation comparison between the one or more connected components identified within each of the plurality of images, a second plurality of connected components matching at least one of the first plurality of connected components; and extract matching text from the second plurality of connected components based at least in part on matches with the at least one of the first plurality of connected components.

In various embodiments, the computer program product is further configured to cause the processor to: train an object detection model with the first plurality of connected components and the second plurality of connected components; identify, via the object detection model, a plurality of fields matching at least one of the first plurality of connected components or the second plurality of connected components; and extract matching text from the plurality of fields based at least in part on matches with the at least one of the first plurality of connected components or the second plurality of connected components.

In certain embodiments, training an object detection model comprises supervised training. In various embodiments, identifying a second plurality of connected components comprises: generating, via a neural network, a vector representation of each of the one or more connected components identified within each of the plurality of images; identifying a match between a vector representation of the second plurality of connected components with a vector representation of the first plurality of connected components; and associate the matching text of the first plurality of connected components with the second plurality of connected components.

In various embodiments, identifying a match between a vector representation of the second plurality of connected components with a vector representation of the first plurality of connected components comprises: determining a correlation between the vector representation of the first plurality of connected components and others of the one or more connected components identified within the plurality of images; and identifying the second plurality of connected components based on a determination that the vector representation of the second plurality of connected components satisfies a correlation criterion with the first plurality of connected components. According to certain embodiments, the computer program product is further configured to cause the processor to: compare the extracted matching text against one or more field names of a field-of-interest; and identify one or more connected components having extracted matching text corresponding to the one or more field names.

In various embodiments, the computer program product is further configured to cause the processor to: identify a region of interest having corresponding connected components having extracted matching text corresponding to the one or more field names; and extract image data corresponding to the region of interest.

Certain embodiments are directed to a computer-implemented method for extracting image data within a region-of-interest from an image, the method comprising: identifying a plurality fields within an image; extracting text from a first field of the plurality of fields; identifying at least one neighboring field; determining, within the image, a location of the first field and a location of the at least one neighboring field; identifying boundaries of a closed perimeter of the region-of-interest within the image, wherein: a first boundary of the closed perimeter of the region-of-interest is aligned with a boundary of the first field; and a second boundary of the closed perimeter of the region-of-interest is aligned with a boundary of one of the at least one neighbor field; and extracting image data within the boundaries of the closed perimeter of the region-of-interest within the image.

In certain embodiments, the method further comprises extracting text from each of the plurality of fields identified within the image; and comparing the text extracted from each of the plurality of fields with one or more field identifiers to identify the first field of the plurality of fields.

In various embodiments, extracting text from the first field comprises executing an optical character recognition (OCR) process on the first field. In certain embodiments, identifying at least one neighbor field comprises: determining location data for each of the plurality of fields; and identifying a second field of the plurality of fields that is nearest to the first field in a horizontal direction within the image, wherein the second field is identified as a neighbor field of the at least one neighbor field.

In various embodiments, identifying at least one neighbor field comprises: determining location data for each of the plurality of fields; and identifying a second field of the plurality of fields that is nearest to the first field in a vertical direction within the image, wherein the second field is identified as a neighbor field of the at least one neighbor field.

In certain embodiments, identifying at least one neighbor field further comprises: identifying a third field of the plurality of fields that is nearest to the first field in a horizontal direction within the image, wherein the third field is identified as a neighbor field of the at least one neighbor field.

In various embodiments, identifying boundaries of the closed perimeter of the region-of-interest within the image comprises: identifying the first boundary of the closed perimeter of the region-of-interest as aligned with a first boundary of the first field; identifying the second boundary of the closed perimeter of the region-of-interest as aligned with a boundary of the second field; and identifying a third boundary of the closed perimeter of the region of interest as aligned with a boundary of the third field; and identifying a fourth boundary of the closed perimeter of the region of interest as aligned with a second boundary of the first field; and wherein the region-of-interest is rectangular.

In various embodiments, identifying boundaries of the closed perimeter of the region-of-interest within the image comprises: identifying a third boundary of the closed perimeter of the region of interest as aligned with an edge of the image.

Certain embodiments are directed to a computing system comprising a non-transitory computer readable storage medium and one or more processors, the computing system configured to: identify a plurality fields within an image; extract text from a first field of the plurality of fields; identify at least one neighboring field; determine, within the image, a location of the first field and a location of the at least one neighboring field; identify boundaries of a closed perimeter of the region-of-interest within the image, wherein: a first boundary of the closed perimeter of the region-of-interest is aligned with a boundary of the first field; and a second boundary of the closed perimeter of the region-of-interest is aligned with a boundary of one of the at least one neighbor field; and extracting image data within the boundaries of the closed perimeter of the region-of-interest within the image.

In certain embodiments, the computing system is further configured to: extract text from each of the plurality of fields identified within the image; and compare the text extracted from each of the plurality of fields with one or more field identifiers to identify the first field of the plurality of fields. In various embodiments, extracting text from the first field comprises executing an optical character recognition (OCR) process on the first field. In various embodiments, identifying at least one neighbor field comprises: determining location data for each of the plurality of fields; and identifying a second field of the plurality of fields that is nearest to the first field in a horizontal direction within the image, wherein the second field is identified as a neighbor field of the at least one neighbor field.

In certain embodiments, identifying at least one neighbor field comprises: determining location data for each of the plurality of fields; and identifying a second field of the plurality of fields that is nearest to the first field in a vertical direction within the image, wherein the second field is identified as a neighbor field of the at least one neighbor field.

In various embodiments, identifying at least one neighbor field further comprises: identifying a third field of the plurality of fields that is nearest to the first field in a horizontal direction within the image, wherein the third field is identified as a neighbor field of the at least one neighbor field.

In certain embodiments, identifying boundaries of the closed perimeter of the region-of-interest within the image comprises: identifying the first boundary of the closed perimeter of the region-of-interest as aligned with a first boundary of the first field; identifying the second boundary of the closed perimeter of the region-of-interest as aligned with a boundary of the second field; and identifying a third boundary of the closed perimeter of the region of interest as aligned with a boundary of the third field; and identifying a fourth boundary of the closed perimeter of the region of interest as aligned with a second boundary of the first field; and wherein the region-of-interest is rectangular.

In various embodiments, identifying boundaries of the closed perimeter of the region-of-interest within the image comprises: identifying a third boundary of the closed perimeter of the region of interest as aligned with an edge of the image.

Certain embodiments are directed to a computer program product comprising a non-transitory computer readable medium having computer program instructions stored therein, the computer program instructions when executed by a processor, cause the processor to: identify a plurality fields within an image; extract text from a first field of the plurality of fields; identify at least one neighboring field; determine, within the image, a location of the first field and a location of the at least one neighboring field; identify boundaries of a closed perimeter of the region-of-interest within the image, wherein: a first boundary of the closed perimeter of the region-of-interest is aligned with a boundary of the first field; and a second boundary of the closed perimeter of the region-of-interest is aligned with a boundary of one of the at least one neighbor field; and extracting image data within the boundaries of the closed perimeter of the region-of-interest within the image.

In various embodiments, the computing system is further configured to: extract text from each of the plurality of fields identified within the image; and compare the text extracted from each of the plurality of fields with one or more field identifiers to identify the first field of the plurality of fields. In certain embodiments, extracting text from the first field comprises executing an optical character recognition (OCR) process on the first field. In various embodiments, identifying at least one neighbor field comprises: determining location data for each of the plurality of fields; and identifying a second field of the plurality of fields that is nearest to the first field in a horizontal direction within the image, wherein the second field is identified as a neighbor field of the at least one neighbor field.

In certain embodiments, identifying at least one neighbor field comprises: determining location data for each of the plurality of fields; and identifying a second field of the plurality of fields that is nearest to the first field in a vertical direction within the image, wherein the second field is identified as a neighbor field of the at least one neighbor field. In various embodiments, identifying at least one neighbor field further comprises: identifying a third field of the plurality of fields that is nearest to the first field in a horizontal direction within the image, wherein the third field is identified as a neighbor field of the at least one neighbor field. In certain embodiments, identifying boundaries of the closed perimeter of the region-of-interest within the image comprises: identifying the first boundary of the closed perimeter of the region-of-interest as aligned with a first boundary of the first field; identifying the second boundary of the closed perimeter of the region-of-interest as aligned with a boundary of the second field; and identifying a third boundary of the closed perimeter of the region of interest as aligned with a boundary of the third field; and identifying a fourth boundary of the closed perimeter of the region of interest as aligned with a second boundary of the first field; and wherein the region-of-interest is rectangular. In certain embodiments, identifying boundaries of the closed perimeter of the region-of-interest within the image comprises: identifying a third boundary of the closed perimeter of the region of interest as aligned with an edge of the image.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 illustrates a field within a portion of a document image according to an embodiment;

FIG. 5 illustrates a region within a portion of a document image according to an embodiment;

FIG. 6 illustrates a portion of a document image highlighting located connected components according to an embodiment;

FIGS. 8-9 illustrate example portions of document images containing handwriting according to an embodiment;

FIGS. 11A-11B illustrate example operations of pre-processing images according to an embodiment;

Figure 12:
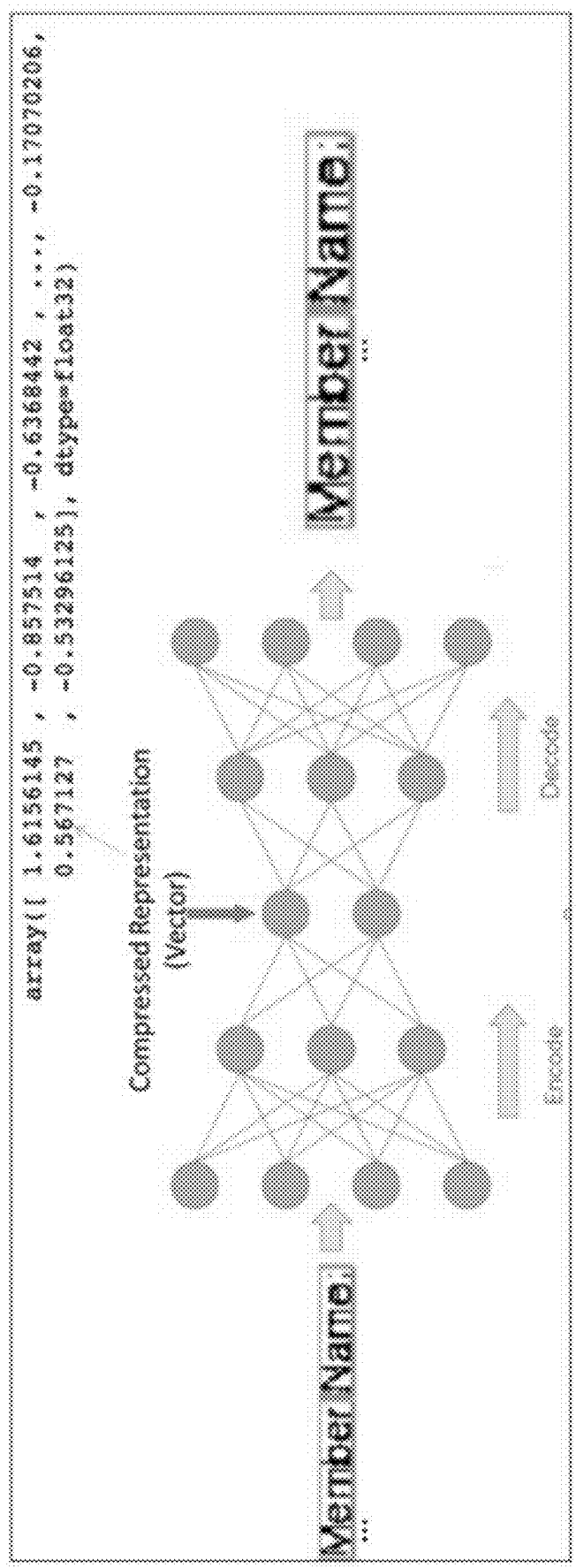
Figure 13:
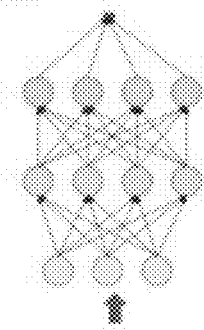
Figure 14:
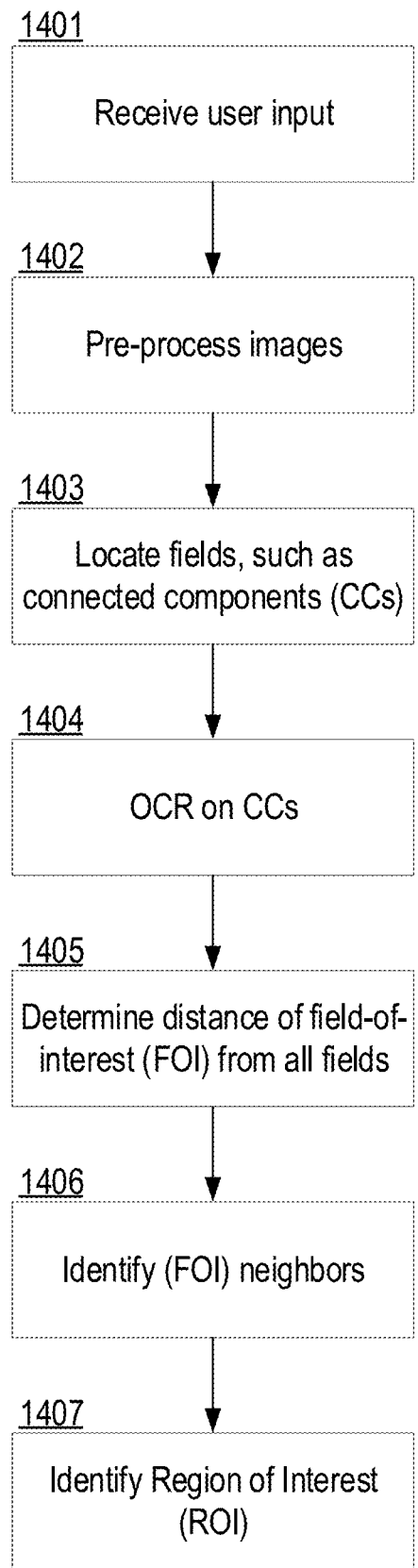
Figure 17:
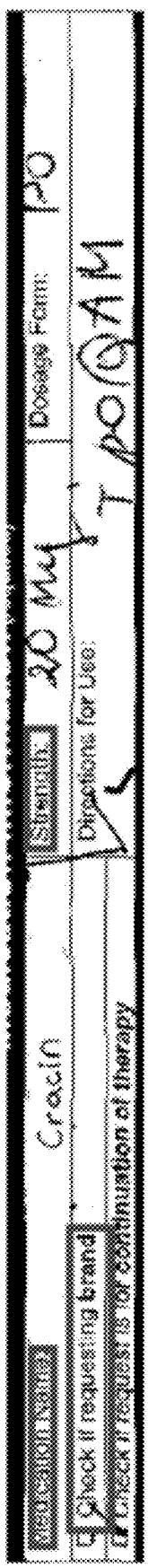
Figure 19:
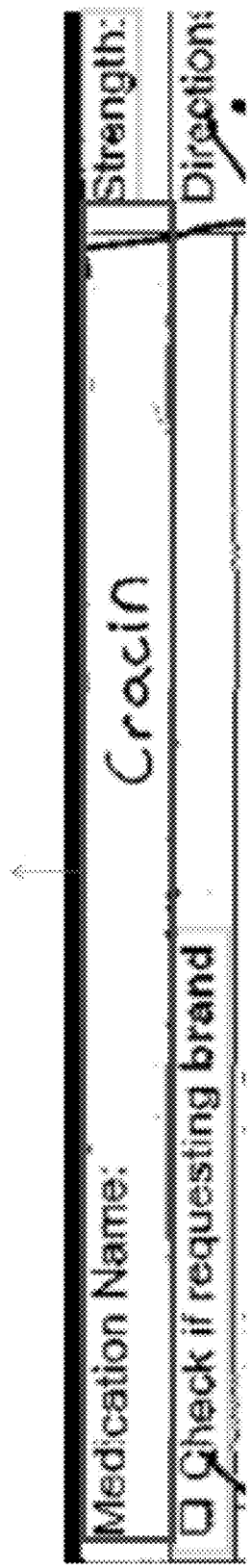
Figure 20B:
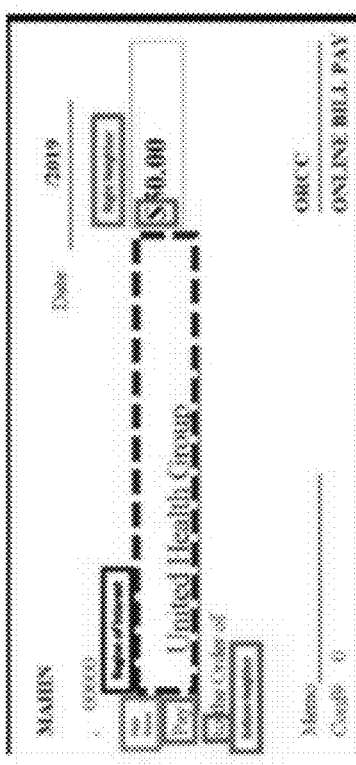
Figure 20A:

FIG. 12 graphically illustrates an encoding process for generating a vector representation of a connected component according to an embodiment;

FIG. 13 graphically illustrates usage of an encoding process to identify a field of interest within a document image according to an embodiment;

FIG. 14 is a flowchart illustrating steps for identifying one or more regions-of-interest within a document image according to an embodiment;

FIG. 15 illustrates mapping of connected components within a document image according to an embodiment;

Figure 16:
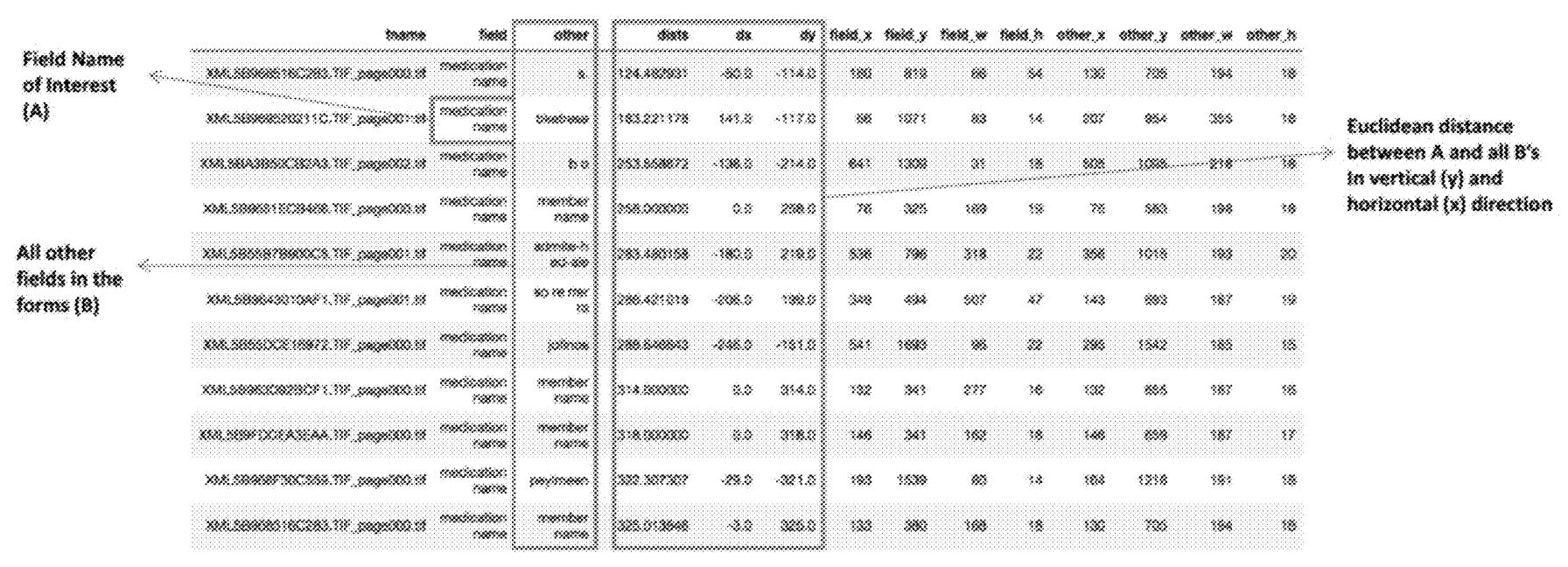

FIG. 16 illustrates mapping relative distances between connected components within a document image according to an embodiment;

FIG. 17 graphically illustrates a plurality of identified connected components within a document image according to an embodiment;

Figure 18:
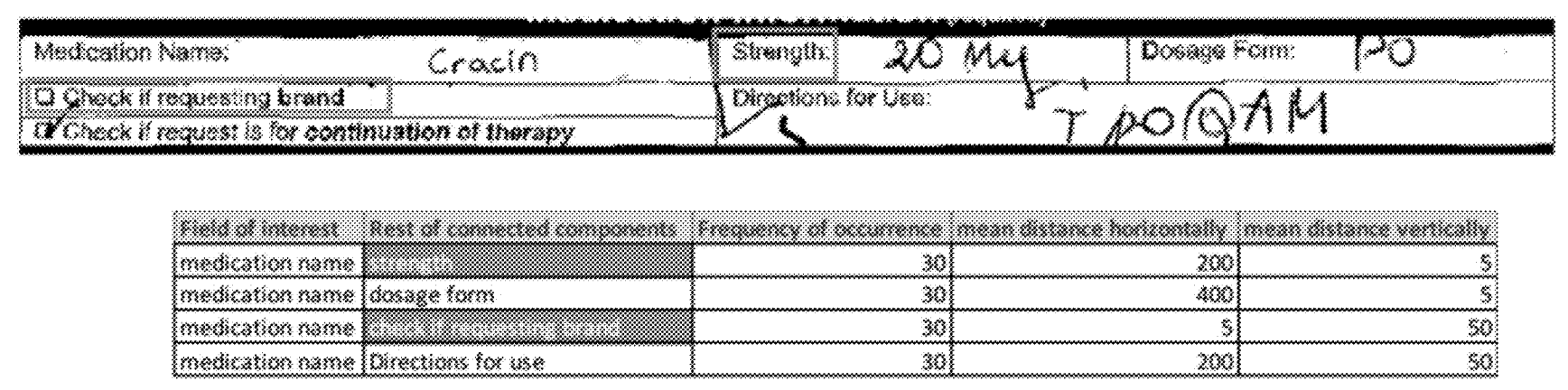

FIG. 18 graphically illustrates the identification of neighboring connected components surrounding a field-of-interest according to an embodiment;

FIG. 19 graphically illustrates the identification of a region-of-interest within a document image according to an embodiment; and FIGS. 20A-20B graphically illustrate the identification of a region-of-interest within a document image according to another embodiment.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
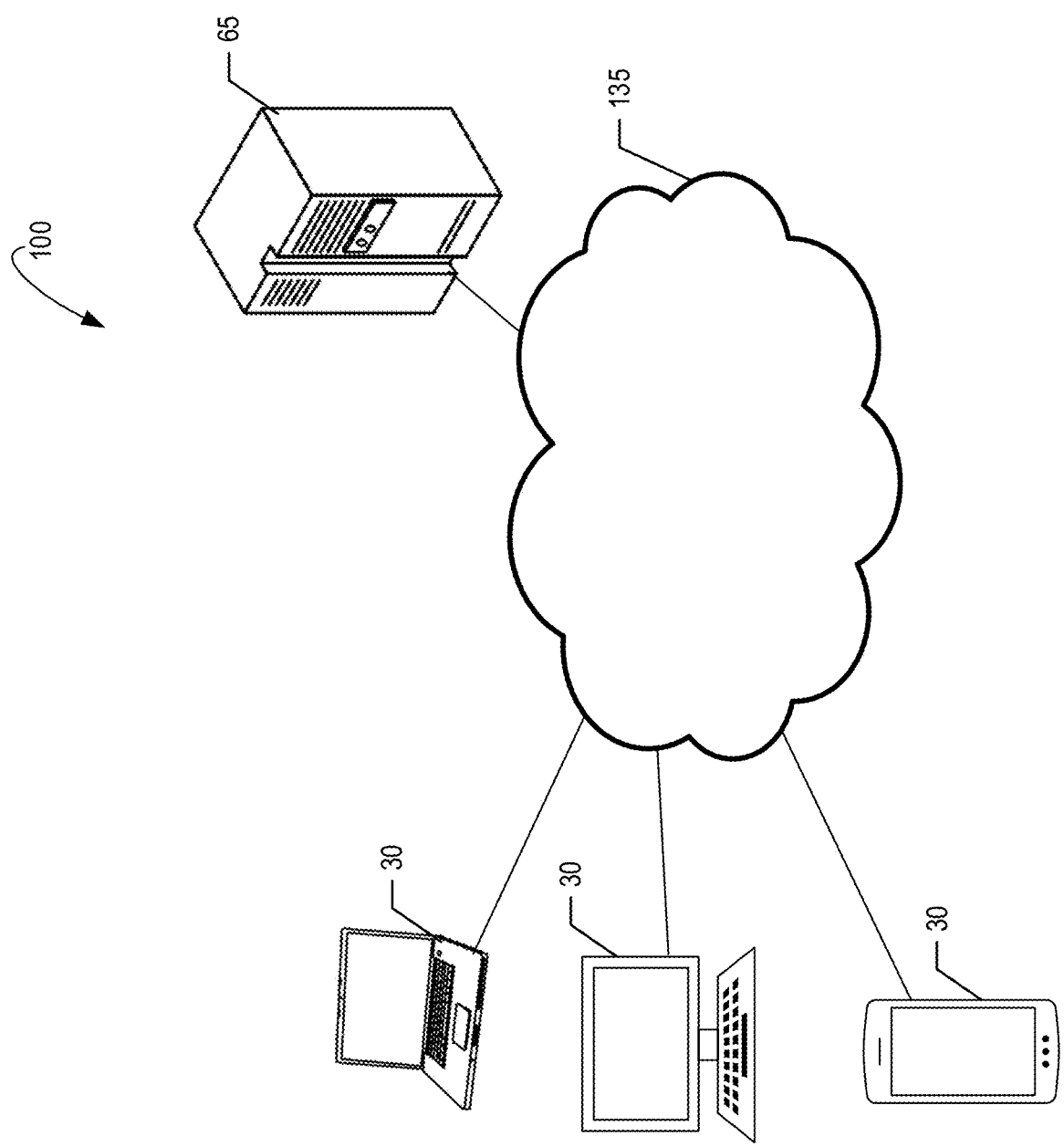
FIG. 1 is a diagram of a document recognition system that can be used in conjunction with various embodiments of the present invention.

FIG. 1 provides an illustration of a document recognition system 100 that can be used in conjunction with various embodiments of the present invention. As shown in FIG. 1, the document recognition system 100 may comprise one or more analytic computing entities 65, one or more user computing entities 30 (e.g., a user computing entity 30 associated with a provider usable to provide data to the analytic computing entity 65; and/or the like), one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Analytic Computing Entity

Figure 2:
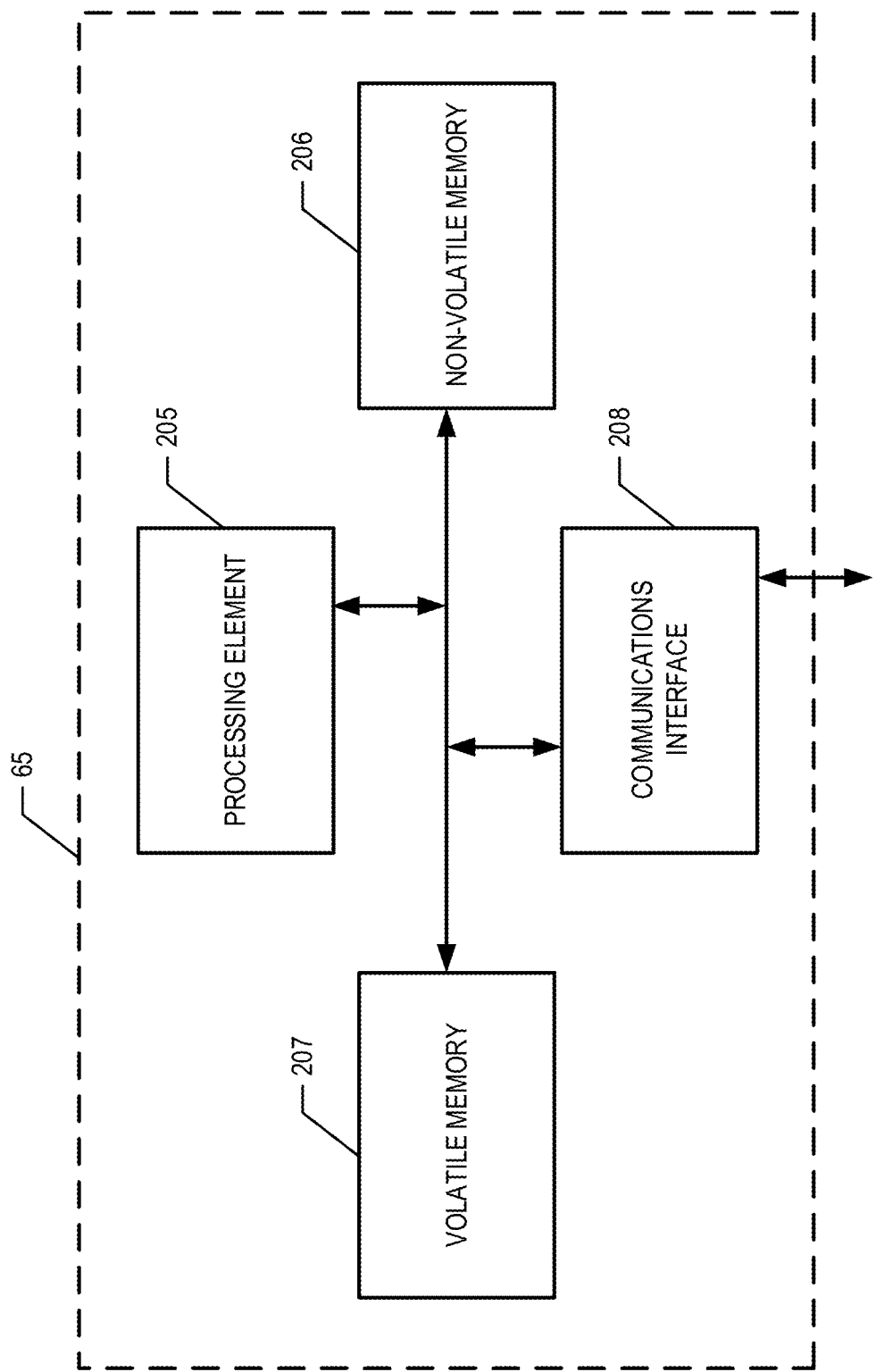
FIG. 2 is a schematic of an analytic computing entity in accordance with certain embodiments of the present invention.

FIG. 2 provides a schematic of an analytic computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, it should be understood that the analytic computing entity 65 may be embodied as a plurality of computing entities, tools, and/or the like operating collectively to perform one or more processes, methods, and/or steps. As just one non-limiting example, the analytic computing entity 65 may comprise a plurality of individual data tools, each of which may perform specified tasks and/or processes, such that collectively, the analytic computing entity 65 may be configured to execute one or more tasks requested by a user.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with other computing entities, one or more user computing entities 30, and/or the like. In certain embodiments, the analytic computing entity 65 may be configured to receive data from one or more data sources, and the analytic computing entity 65 may be configured to receive data indicative of user input, for example, from a user computing entity 30.

As shown in FIG. 2, in one embodiment, the analytic computing entity 65 may include or be in communication with one or more processing elements 205 (also referred to as processors, processing circuitry, and/or similar terms used herein interchangeably) that communicate with other elements within the analytic computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the analytic computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the oncological research system may be stored. As a person of ordinary skill in the art would recognize, the information/data required for the operation of the oncological research system may also be partially stored in the cloud data storage system and partially stored in a locally maintained data storage system.

Memory media 206 may include information/data accessed and stored by the document recognition system to facilitate the operations of the system. More specifically, memory media 206 may encompass one or more data stores configured to store information/data usable in certain embodiments.

In one embodiment, the analytic computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the analytic computing entity 65 with the assistance of the processing element 205 and operating system.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with computing entities or communication interfaces of other computing entities, user computing entities 30, and/or the like.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analytic computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The analytic computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other analytic computing entity 65 components, such as in a distributed system. Furthermore, one or more of the components may be aggregated and additional components performing functions described herein may be included in the analytic computing entity 65. Thus, the analytic computing entity 65 can be adapted to accommodate a variety of needs and circumstances.

b. Exemplary User Computing Entity

Figure 3:
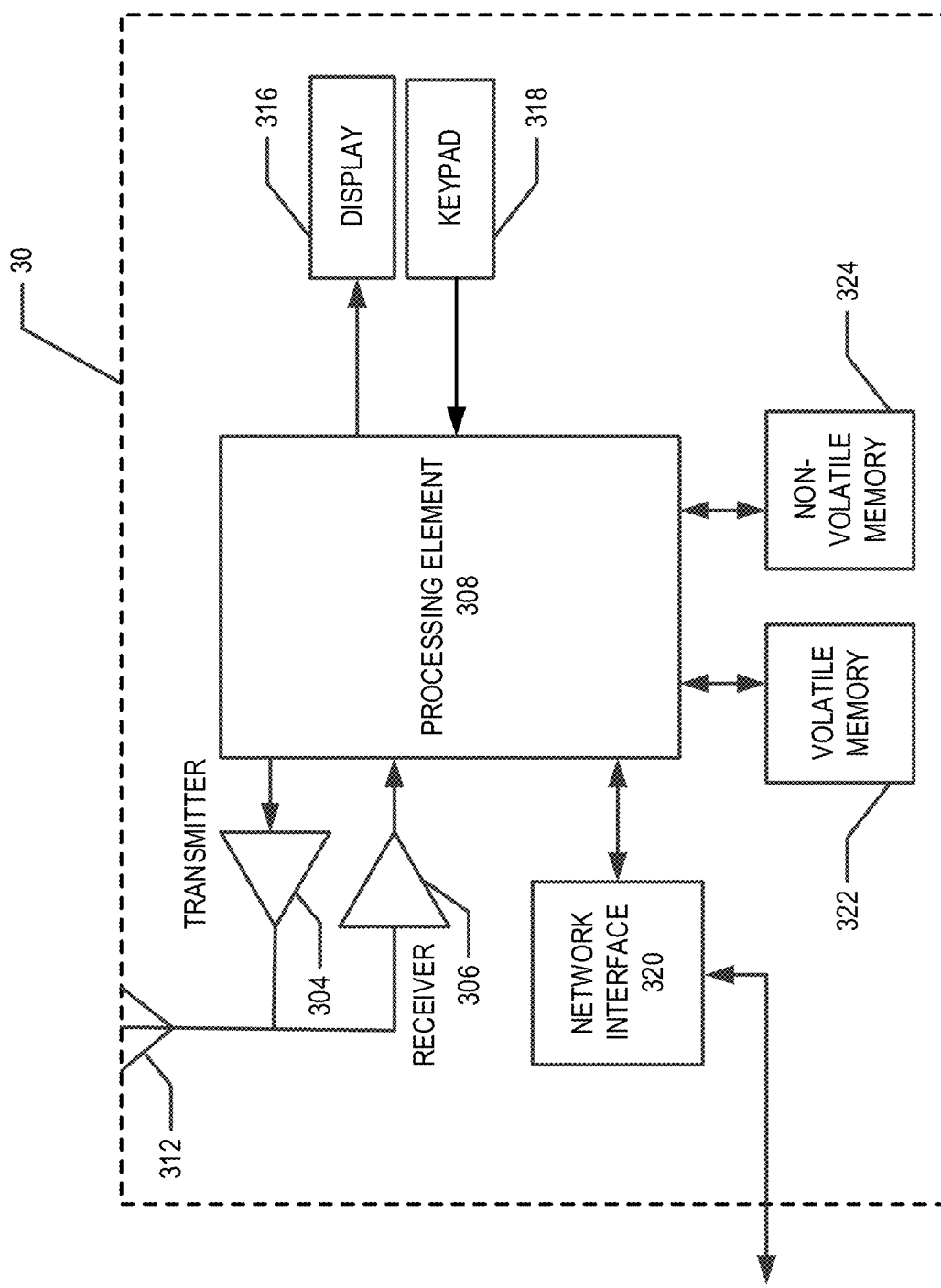
FIG. 3 is a schematic of a user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the analytic computing entity 65. Further, as shown in FIG. 3, the user computing entity may include additional components and features. For example, the user computing entity 30 can include a network interface 320, an antenna 312, a transmitter 304 (e.g., radio), a receiver 306 (e.g., radio), and a processing element 308 that provides signals to and receives signals from the network interface 320 and/or the transmitter 304 and receiver 306, respectively. The signals provided to and received from the transmitter 304 and the receiver 306, respectively, may include signaling information/data in accordance with an air interface standard of applicable wireless systems to communicate with various entities, such as an analytic computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the analytic computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Reference will now be made to FIGS. 4-20B in the following discussions of various embodiments for identifying fields-of-interest and regions-of-interest within document images according to certain embodiments.

a. Brief Overview

Certain embodiments are configured to identify fields of interest (FOIs) and/or regions of interest (ROIs) within images, such as document images (e.g., scanned document images, photographs of documents, and/or the like. These documents may be embodied as sheets, forms, labels (e.g., secured to products/containers), signs, and/or the like, including text. Various embodiments are configured for identifying text within FOIs (and other fields) despite poor photo/scan quality, intersecting text, lines, and/or the like, or other aspects that create difficulties for identifying text within a document image. Accordingly, FOIs may be identified within hand-filled forms scanned into a system (e.g., analytic computing entity 65), thereby enabling the identification of ROIs, which may contain hand-written text deemed relevant for an ROI.

1. Definitions

As discussed herein, "Optical Character Recognition" (OCR) refers to computer-based tools for obtaining text contained within an image. As an example, an image, such as a scanned document (e.g., a PDF, JPG, GIF, and/or the like file type) may be reviewed via OCR techniques to recognize and retrieve text from within the image, thereby enabling additional computing processes utilizing the recognized text.

A "Field of Interest" (FOI) as discussed herein refers to a field embodying text within a document image (e.g., a form) matching text provided by a user (e.g., via user input). An FOI of certain embodiments is embodied as a field of plurality of fields within a document. Those individual fields may each be embodied as a connected component (discussed herein) or other field type including artefacts that form a word. For example, an FOI may encompass the name of a particular fillable region within a blank (unfilled) form. As an example, FIG. 4 illustrates an example portion of a fillable form, having an FOI matching user input of "Member Name:". As shown therein, the FOI encompasses text of "Member Name:"—which is located within a region that may be filled (e.g., via handwriting, type-writing, and/or the like) with a Member's name (in this case "Sindhura").

A "Region of Interest" (ROI) as discussed herein refers to an area (e.g., a rectangular area bound by an enclosing perimeter) that may contain information. In the case of a fillable form, for example, an ROI may refer to the portion of the form in which a user may handwrite or otherwise fill in requested in formation. An ROI may have a corresponding FOI in accordance with certain embodiments. As an example as shown in FIG. 5, the outlined ROI corresponds to the included FOI of "Member Name:" (which is not itself outlined). The ROI encompasses the entire area within the form in which input corresponding to the identified FOI may be provided. Although the illustrated embodiment shows the ROI of "Member Name:" to be bound by lines surrounding the ROI, it should be understood that ROIs need not have visible bounding lines defining a perimeter thereof.

As discussed herein a "connected component" is defined as a field encompassing an artefact or collection of closely spaced artefacts visible within an image (e.g., a document image) that may form a word. Connected components may be identified through a process of dilation, in which each identified artefact identified within an image is expanded by a defined number of pixels (e.g., 1-2 pixels). Those artefacts that are closely spaced become connected as a result of the expansion to create a continuously connected artefact. Each of these continuously connected artefacts (and the original artefact or collection of closely spaced artefacts) are then identified as a connected component. In the illustrated example of FIG. 6, each identified connected component is outlined in the illustrated document image. For example, "Lidoderm," "Patch," "Prior," "Member," and "Name" (among others) are identified as connected components. In certain embodiments, closely-spaced connected components (e.g., "Member" and "Name") may be identified as related connected components, for example, based on a determination that the closely-spaced connected components are within a defined distance of one another. Other fields as discussed herein include artefacts that collectively define letters and/or words, but may not be capable of recognition through the foregoing connected component identification methods discussed above. For example, other fields may include text identified through object detection methodologies as discussed herein.

Figure 7:
FIG. 7 illustrates bounding boxes around text according to an embodiment.

FIG. 7 illustrates example "bounding boxes" in accordance with certain embodiments. Bounding boxes may comprise a closed perimeter surrounded by boundaries drawn around connected components (or a region-of-interest, as discussed herein) to completely encompass an identified connected component. The perimeter of a bounding box may be rectangular and defined by the left-most, topmost, right-most, and bottom-most points of a connected component. In other embodiments, the perimeter of the bounding box may be spaced a defined distance away from edges of artefacts defining a connected component (e.g., 1 pixel). As illustrated in FIG. 7, a bounding box may be characterized by location data, for example, provided in vector form. The location data may identify the location of the bounding box within an image (e.g., relative to a top-left most corner of the image). The location data may identify the location of the top-left most corner of the bounding box (e.g., in x- and y-coordinates), as well as the length of the bounding box (e.g., the length parallel to an x-axis or horizontal axis of the document) and the height of the bounding box (e.g., the height parallel to a y-axis or vertical axis of the document). It should be understood that other points of the bounding box may be characterized by the location data (e.g., the bottom-right most corner). In the illustrated embodiment the bounding box surrounding "TEXT 1" is characterized by the location data [100, 100, 301, 83]—which identifies the location of the top-left most corner of the bounding box as at position (100, 100) within the image (e.g., located 100 pixels away from the left edge of the image and 100 pixels away from the top edge of the image), and the bounding box has a length of 301 (e.g., 301 pixels) and a height of 83 (e.g., 83 pixels).

2. Technical Problem

Figures 8, 9:
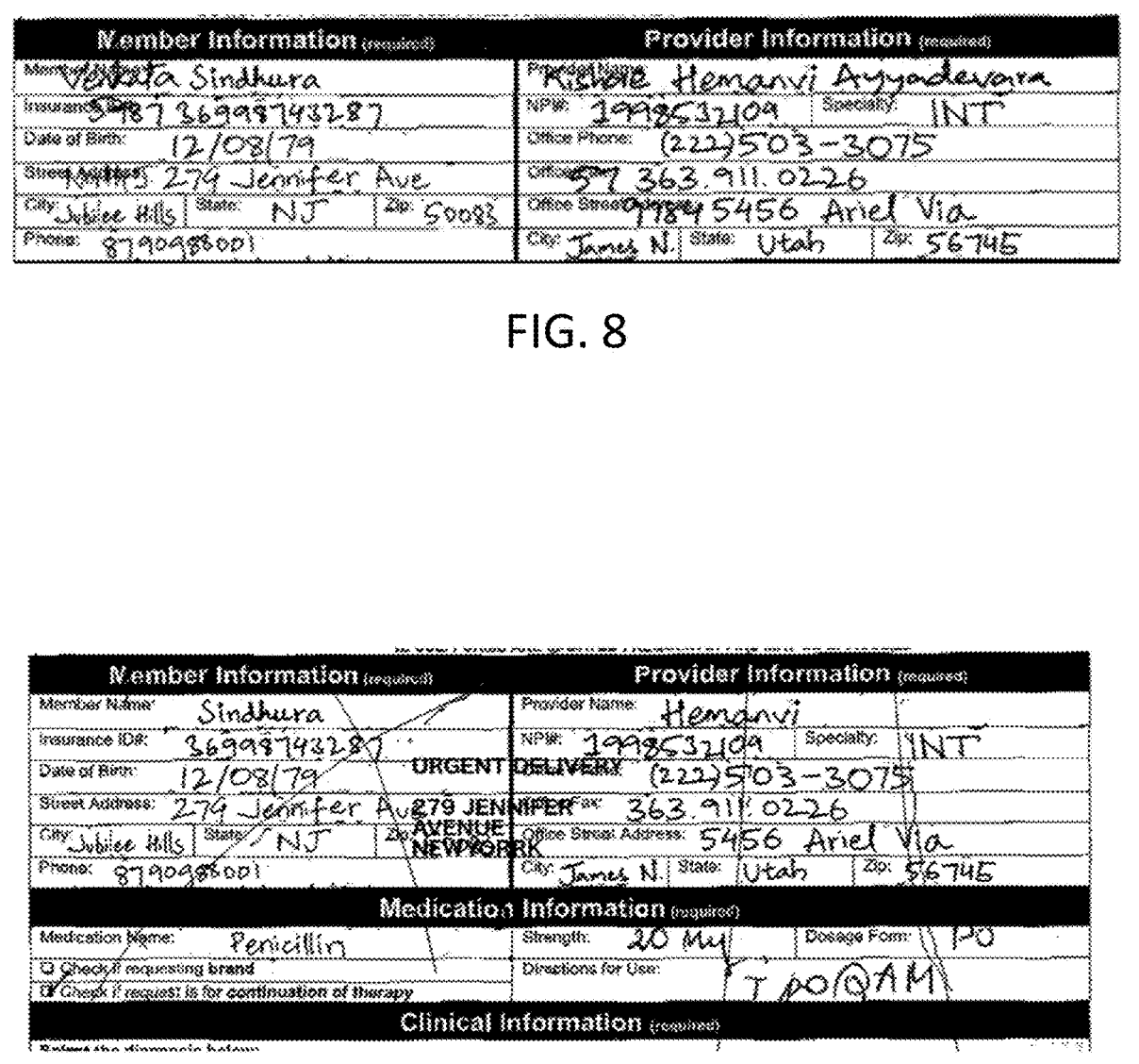

Standard Optical Character Recognition (OCR) techniques fail in cases in which a document image quality is poor, where handwriting overlaps text to be identified, where text is blurry, and/or the like. For example, FIGS. 8-9 illustrate example forms for which certain text within the form may be difficult or impossible to identify utilizing standard OCR techniques. The problem of identifying text within document images becomes more challenging when a system is utilized for intaking (e.g., scanning) documents characterized by different templates, magnifications, and/or the like—the location of specific fields and/or regions may change between forms, thereby preventing systems from using field locations to identify fields and/or regions of interest on a particular document. Furthermore, certain document imaging equipment (e.g., scanners) may place artifacts (e.g., lines, marks, strikethroughs and/or the like) on the document images, which create further difficulties for existing technologies to accurately identify particular portions of a document image.

3. Technical Solution

Various embodiments utilize a plurality of machine-learning techniques to identify text within document images, thereby enabling identification of FOIs and/or ROIs within document images of poor image quality. After preprocessing document images (e.g., rotating documents, resizing documents, and/or the like), the analytic computing entity 65 identifies connected components within the document image, and execute standard OCR techniques on those connected components. The analytic computing entity 65 also generates a vector representation of each connected component and identifies an average vector representation of those connected components recognized through standard OCR techniques. The vector representation of other connected components may then be compared against the vector representations of the identified connected components to identify candidate connected components likely to embody similar text. The analytic computing entity 65 then trains and utilizes deep learning object detection models to identify other fields as potential FOIs based at least in part on training data generated based at least in part on the correctly identified connected components. For example, fields incapable of recognition through connected component related techniques may be identified through object detection techniques that rely on those correctly identified connected components to train the object detection model, for example, to identify fields having optical qualities deemed similar to those correctly identified connected components.

Moreover, utilizing identified FOIs (identified via any of a variety of methodologies), ROIs may be identified by identifying the location of each field (such as each connected component) located within a document image, determining the distances between the FOI and other fields within the document image, identifying those fields deemed neighbors of the FOI (e.g., immediately below neighbor, immediate left neighbor, immediate right neighbor, and/or the like), and identifying the ROI as the region between the FOI and one or more neighbors of the FOI.

b. Field-of-Interest Identification

Figure 10:
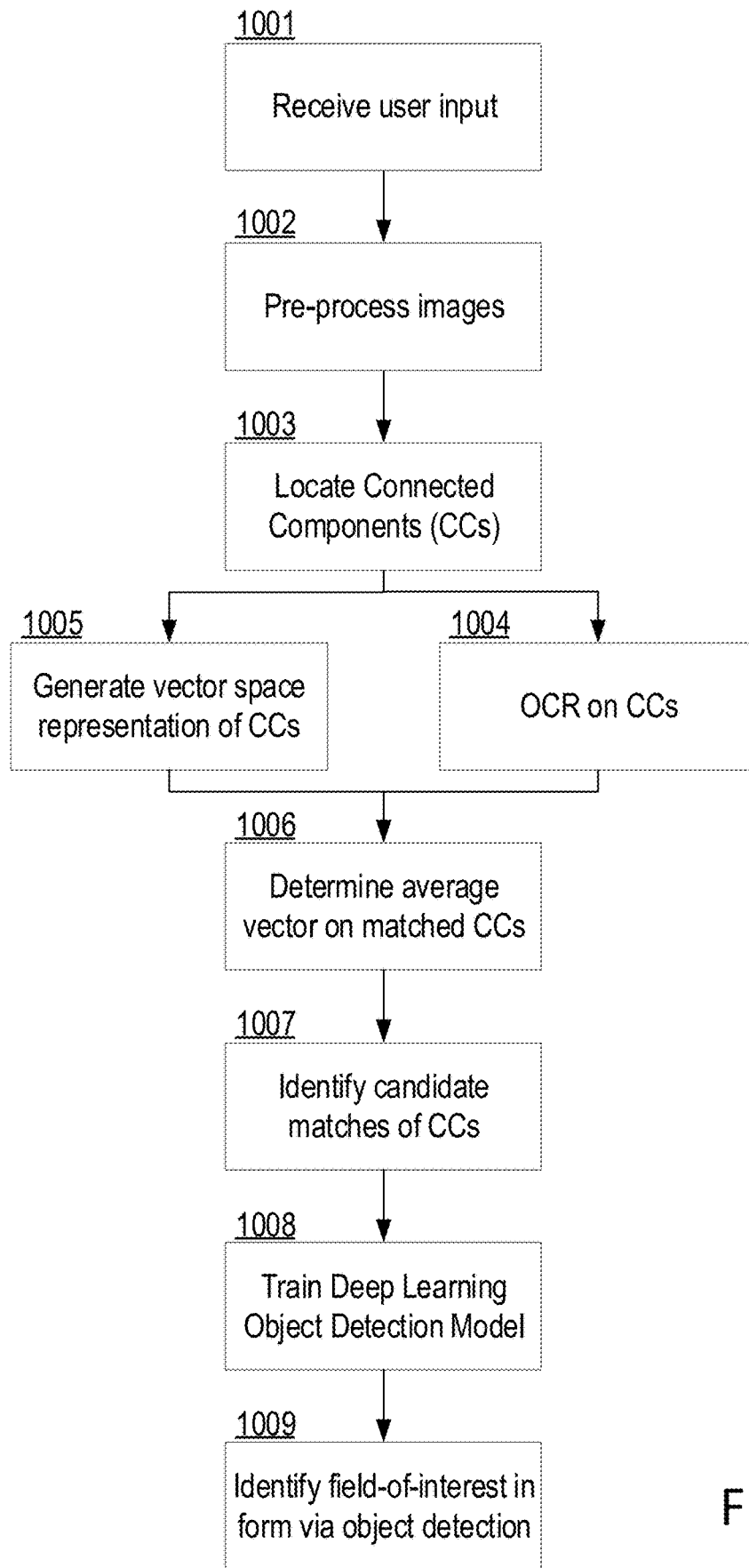
FIG. 10 is a flowchart illustrating steps for identifying one or more fields-of-interest within a document image according to an embodiment.

FIG. 10 is a flowchart illustrating an automated process for identifying FOIs within an image and extracting text from those identified FOIs within the image. As illustrated at Block 1001, the process may begin upon receipt of user input identifying field names to identify within one or more images. The user input may be provided as text input identifying names of FOIs to identify within images. In certain embodiments, the user input may identify alternative spellings, alternative phrases, and/or the like, which each refer to an FOI. For example, "Member Name" may be identified within user input as alternatively being referred to as "Name," "Member," "User Name," "Customer Name," "Full Name," and/or the like. The user input may be provided in a table (e.g., with all potential alternative phrases listed within a single row or column). The field names may be stored in a memory of the analytic computing entity 65, for example, for later retrieval during steps for identifying FOIs.

As indicated at Block 1002, the analytic computing entity 65 may perform input preprocessing steps to facilitate later identification of text within images. As a part of the image preprocessing steps, one or more images (e.g., document images) may be received by the analytic computing entity 65 for analysis and identification of FOIs within the images. These images may be received as separate image files (e.g., separate PDFs, JPGs, GIFs, and/or the like) and/or a single image file comprising a plurality of separate images (e.g., a single PDF comprising a plurality of sheets, each sheet comprising one or more images).

Figures 11A, 11B:
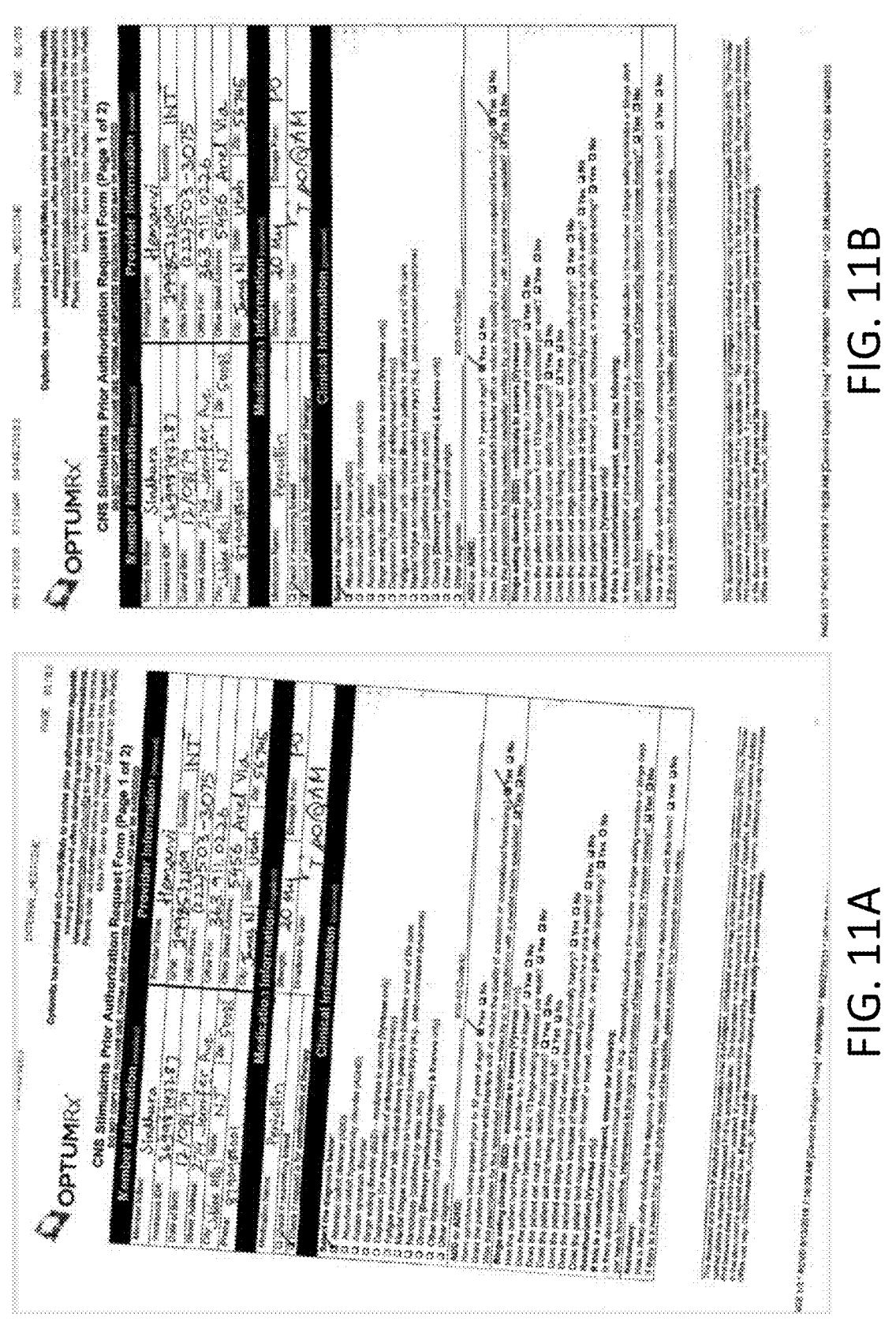

Moreover, input preprocessing may comprise rotating images to straighten the images (e.g., such as rotating the received image as shown in FIG. 11A to the rotated image as shown in FIG. 11B). In certain embodiments, one or more sharpness preprocessing steps may be performed to increase the sharpness of one or more of the received images; one or more brightness preprocessing steps may be performed to increase the brightness of one or more of the received images; one or more contrast preprocessing steps may be performed to increase the contrast of one or more of the received images; and/or the like. Identification of types of preprocessing steps to be performed on each image may be determined based at least in part on image scan processes to identify the image quality of a scanned image. The image preprocessing may be performed on a plurality (e.g., all) images received prior to beginning image analysis to identify connected components (or other fields) and/or FOIs within the images.

Figure 6:
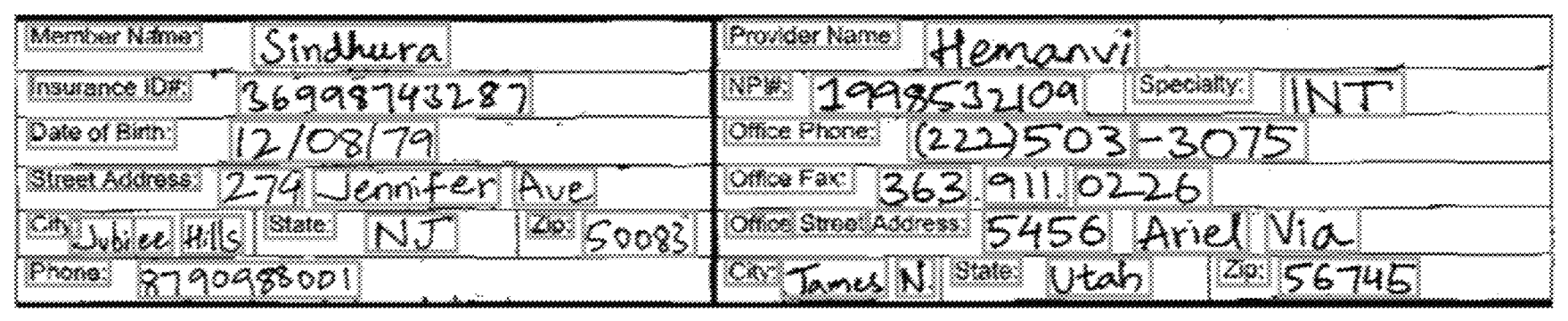

With reference to Block 1003, the process continues by identifying connected components within document images. As discussed above, connected components may be identified by dilating, so as to enable the formation of bounding boxes around each identified connected component (e.g., as illustrated in FIG. 6, discussed above).

The analytic computing entity 65 may then execute traditional OCR processing on each identified connected component within the document image, to determine whether an accurate identification of text within the connected component is possible, as indicated at Block 1004. For those connected components in which an accurate identification of text is possible via OCR, the analytic computing entity 65 is configured to extract text from the connected components. In certain embodiments, OCR processes may be characterized by a confidence score indicating the likelihood that the text identified within the connected component is accurate. Text identified as having at least a threshold (e.g., minimum) confidence score may be characterized as an accurate text extraction. Moreover, text extracted from connected components via OCR may be compared against field names identified within the user input identifying field names corresponding to identified FOIs. Upon identifying a match between text extracted from a connected component via OCR and a field name within the provided user input, the connected component corresponding to the matching field name may be flagged as an OCR match. However, it is expected that for poor quality document images, the rate of identifying OCR matches will be relatively low, even within a large sample set of document images.

As illustrated at Block 1005, the analytic computing entity 65 further generates a vector-space representation of each connected component, for example, via a neural network, such as an autoencoder configured to generate a compressed, vector-space representation of each connected component as graphically illustrated in FIG. 12. The compressed vector space representation may be embodied as a vector comprising a plurality of numerical values that collectively represent the connected component, and which may be utilized to reconstruct the original connected component, such that the compressed vector space representation uniquely represents a particular connected component.

Utilizing the OCR matches identified as discussed above in reference to Block 1004, the analytic computing entity 65 then determines an average vector representation of matched connected components for a given field name of an FOI. For example, the analytic computing entity 65 may be configured to determine the average vector representation of all instances of "Member Name" identified via OCR within a corpus of a plurality of document images, utilizing the vector representations of those OCR matches as identified as noted in reference to Block 1005.

With reference to Block 1007 of FIG. 10, the analytic computing entity 65 identifies candidate matching connected components by comparing each vector representation of connected components with the average vector representations of identified matching connected components. Connected components satisfying a correlation criterion, such as having a high correlation (and corresponding high correlation score, such as a correlation score above a threshold value) with an average vector representation of an FOI field name are indicated as matching the average vector representation of those connected components previously classified via OCR techniques and are classified as field images representing a field name identified within the user input. As just one example, a threshold correlation value for identifying a connected component as a field image may be 95%; although other threshold correlation values may be utilized in certain embodiments. Such processing may result in a relatively high number of matches being identified, even within a corpus of poor-quality images.

As indicated at Block 1008 of FIG. 10, the analytic computing entity 65 trains a machine-learning model, such as a deep-learning object detection model to identify other fields representing field names of one or more FOIs identified within the user input. The machine-learning model may comprise an unsupervised machine-learning model or a supervised machine learning model utilizing the OCR matches and/or the identified field images together with data identifying corresponding textual contents of those connected components, as training data. For example, a supervised machine-learning model may be utilized, utilizing the results of correctly identified connected components as illustrating features relevant for identifying other fields including text matching the text of the identified connected components.

Utilizing the trained machine-learning model, the analytic computing entity 65 may then utilize the machine-learning model to identify fields representing text corresponding to field names, as indicated at Block 1009. The text may be extracted from the document image, so as to enable usage of the included text in various computing processes. For example, the extracted text may be utilized to index data within an ROI determined to correspond to the FOI (identifying an ROI is discussed in detail below). FIG. 13 graphically depicts the process of analyzing a document image with a trained machine-learning model to identify an FOI corresponding to "Member Name."

c. Region-of-Interest Identification

Moreover, FIG. 14 illustrates a process for identifying ROIs within a document image in accordance with certain embodiments. As indicated at Block 1401, the process may begin upon receipt of user input identifying field names to identify within one or more images. The user input may be provided as text input identifying names of ROIs (e.g., regions having corresponding field names) to identify within images. In certain embodiments, the user input may identify alternative spellings, alternative phrases, and/or the like, which each refer to an ROI. For example, "Member Name" may be identified within user input as alternatively being referred to as "Name," "Member," "User Name," "Customer Name," "Full Name," and/or the like. The user input may be provided in a table (e.g., with all potential alternative phrases listed within a single row or column). The field names may be stored in a memory of the analytic computing entity 65, for example, for later retrieval during steps for identifying ROIs.

As indicated at Block 1402, the analytic computing entity 65 may perform input preprocessing steps to facilitate later identification of text within images (as discussed in reference to FIG. 10, above). As a part of the image preprocessing steps, one or more images (e.g., document images) may be received by the analytic computing entity 65 for analysis and identification of ROIs within the images. These images may be received as separate image files (e.g., separate PDFs, JPGs, GIFs, and/or the like) and/or a single image file comprising a plurality of separate images (e.g., a single PDF comprising a plurality of sheets, each sheet comprising one or more images).

Moreover, input preprocessing may comprise rotating images to straighten the images (e.g., such as rotating the received image as shown in FIG. 11A to the rotated image as shown in FIG. 11B). In certain embodiments, one or more sharpness preprocessing steps may be performed to increase the sharpness of one or more of the received images; one or more brightness preprocessing steps may be performed to increase the brightness of one or more of the received images; one or more contrast preprocessing steps may be performed to increase the contrast of one or more of the received images; and/or the like. Identification of types of preprocessing steps to be performed on each image may be determined based at least in part on image scan processes to identify the image quality of a scanned image. The image preprocessing may be performed on a plurality (e.g., all) images received prior to beginning image analysis to identify connected components (and/or other fields) and/or ROIs within the images.

With reference to Block 1403, the process continues by identifying fields, such as connected components within document images. As discussed above, connected components may be identified by dilating, so as to enable the formation of bounding boxes around each identified connected component (e.g., as illustrated in FIG. 6, discussed above). As discussed herein, other fields may be identified via any of a variety of other methodologies to enable the identified fields during the identification of particular regions of interest.

The analytic computing entity 65 may then execute traditional OCR processing on each identified connected component within the document image, to determine whether an accurate identification of text within the connected component is possible, as indicated at Block 1404. In certain embodiments, OCR processes may be characterized by a confidence score indicating the likelihood that the text identified within the connected component is accurate. Text identified as having at least a threshold (e.g., minimum) confidence score may be characterized as an accurate text extraction. Moreover, text extracted from connected components may be compared against field names identified within the user input identifying field names corresponding to identified ROIs. Upon identifying a match between text extracted from a connected component via OCR and a field name within the provided user input, the connected component corresponding to the matching field name may be flagged as an OCR match. In certain embodiments, a plurality of other text identification methodologies may be utilized for one or more fields within a document, such as those discussed above in reference to identifying FOIs and as illustrated in FIG. 10.

Upon identifying text within one or more fields (e.g., connected components), data regarding bounding boxes (e.g., location data and/or size data, such as discussed in reference to FIG. 7, above) may be stored in a memory associated with the analytic computing entity 65, such as in a data table as shown in FIG. 15. The location and size data stored for each bounding box associated with fields (e.g., connected components indicative of FOIs or text identified as associated with ROIs within a form) may be provided in relative terms (e.g., the distance, measured in pixels, from a single datum, such as the upper left corner of the image), thereby enabling a determination of relative locations of various identified fields (e.g., connected components) within the image.

In various embodiments, the analytic computing entity 65 may be configured to filter the identified fields so as to focus the further analysis on those fields deemed likely to represent field names associated with particular regions within a document. As just one example, the analytic computing entity 65 may apply an appearance threshold to a collection of documents identifying a minimum number of instances that a particular field is identified within the collection of documents. For example, an appearance threshold may set a minimum of 20% of the documents within a collection of documents must include at least one instance of a particular field for that field to be considered during further analysis. The appearance threshold may be set manually, or the appearance threshold may be determined automatically (e.g., via machine-learning algorithms configured to identify an appropriate appearance threshold for a particular collection of documents). It should be understood that other criteria may be utilized in certain embodiments to focus further analysis on fields identified as likely to be associated with particular fillable regions in a document.

With reference to Block 1405 of FIG. 14, the analytic computing entity 65 is configured to determine distances between fields (e.g., FOIs) within the document image based at least in part on the previously identified locations and sizes of fields. As noted above, such analysis may be performed only considering those fields satisfying an applicable appearance threshold (or other appearance criteria), although other embodiments may apply such analysis to all fields identified within a document. For example, as shown in FIG. 16, distances between fields may be determined for each of a plurality of pairs of fields (e.g., pairs of FOIs). As shown in FIG. 16, the distance between the fields "medication name" and other identified fields may be determined. FIG. 16 shows distances between "medication name" and "s."; between "medication name" and "bketrese"; between "medication name" and "b o"; and between "medication name" and "member name"; among other combinations. As is evidence from the example data shown in FIG. 16, distances between fields may be determined between complete words (e.g., "member name") or incomplete or otherwise improperly identified words (e.g., bketrese"), particularly in embodiments that do not implement an appearance threshold for filtering fields for further analysis.

Moreover, as shown in FIG. 16, distances between fields may be determined as an overall distance (shown in the "dists" column, which indicates the distance between the fields reflected in the "field" column and the fields reflected in the "other" column), as well as horizontal- and vertical-components of the distance (e.g., the horizontal distance between fields reflected in the "dx" column shown in FIG. 16 and the vertical distance between fields reflected in the "dy" column shown in FIG. 16). These distances may be reflected as the distances between specific points of the bounding box associated with a field. For example, the distances reflected in FIG. 16 are measured between the upper left corners of the bounding box of each of the pairs of fields.

As indicated at Block 1406 of FIG. 14, the analytic computing entity 65 is configured to identify FOI neighbors (e.g., neighboring fields) relative to particular FOIs (e.g., FOIs corresponding to a particular ROI) based at least in part on the determined distances between FOIs. The neighboring fields (also referred to herein as the FOI neighbors) of the FOI may be identified based at least in part on an analysis of a plurality of document images, or the FOI neighbors may be identified based at least in part on an analysis of a single document image. For example, for a given FOI (or other field), horizontal neighbors may be identified as being neighboring fields determined to be closest to the given FOI in terms of the vertical distance (e.g., the "dy" value). This analysis may be performed over a plurality of document images, such as by determining the average location of various FOIs, and determining the closest fields, on average (e.g., based on average locations of fields), in the vertical direction. Those horizontal neighbors may be identified as left-neighbors or right-neighbors based at least in part on a comparison of horizontal locations. For example, those neighbors having a horizontal location value lower than the particular FOI may be identified as left neighbors, and those neighbors having a horizontal location value higher than the particular FOI may be identified as right neighbors.

Similar determinations may be made for vertical neighbors. For example, for a given FOI (or other field), vertical neighbors may be identified as being neighboring fields determined to be closest to the given FOI in terms of the horizontal distance (e.g., the "dx" value). This analysis may be performed over a plurality of document images, such as by determining the average location of various FOIs, and determining the closest fields, on average (e.g., based on average locations of fields), in the horizontal direction. Those vertical neighbors may be identified as top-neighbors or bottom-neighbors based at least in part on a comparison of vertical locations. For example, those neighbors having a vertical location value lower than the particular FOI may be identified as top neighbors, and those neighbors having a vertical location value lower than the particular FOI may be identified as bottom neighbors.

FIGS. 17-18 illustrate example identifications of located neighboring fields (e.g., connected components) of a given FOI. As shown in FIG. 17, the particular FOI in question may be identified (e.g., based on user input) as "Medication Name." The horizontal and vertical neighbors may be identified as "Strength" and "Check if requesting brand," respectively, based on horizontal and vertical distances between fields. FIG. 18 provides additional data indicative of the identification of horizontal and vertical neighbors of an FOI, based on an analysis of a plurality of document images. As indicated, "Strength" occurs 30 times (likely corresponding to 30 analyzed document images), and has a small average vertical distance (i.e., 5 pixels). Similarly, "Check if requesting Brand" occurs 30 times, and has a small average horizontal distance (i.e., 5 pixels). By contrast, both "Dosage form" and "Directions for use" are characterized by substantially higher vertical and horizontal distances away from the "medication name" FOI.

As indicated at Block 1407, the analytic computing entity 65 then identifies the ROI based at least in part on determined location data of the corresponding FOI and the corresponding neighboring fields. The relative location of the ROI versus applicable FOIs may be determined based at least in part on the formatting of the form reflected within the document image (e.g., the ROI should encompass the corresponding FOI; the ROI should be positioned above the corresponding FOI; the ROI should be positioned below the corresponding FOI; and/or the like). Appropriate formatting may be determined automatically or manually, in various embodiments. With reference to the example shown in FIG. 19, the analytic computing entity 65 may be configured to identify location data indicative of the location of the ROI as within a closed perimeter having boundaries encompassing the corresponding FOI and extending partially below and to the right of the corresponding FOI (e.g., based at least in part on formatting data identifying such ROI boundary limitations). Based on this known formatting, the analytic computing entity 65 is configured to outline the ROI for the "Medication Name" field with a bounding box having an upper left corner matching the upper left corner of the corresponding FOI, such that two edges of the bounding box encircling the closed perimeter of the ROI are aligned with edges of the corresponding FOI (i.e., the "Medication Name" FOI in the embodiment shown in FIG. 19); a lower edge aligned with the upper edge of the bottom neighboring field (i.e., the upper edge of the bounding box surrounding "Check if requesting brand" in FIG. 19); and a right edge aligned the left edge of the right neighboring field (i.e., the left edge of the bounding box surrounding "Strength" in FIG. 19). Image data within the identified ROI may then be extracted (e.g., the portion of the document image within the ROI may be stored within an indexed database, such as to enable a user to retrieve the portion of the document image reflecting what a particular patient wrote in the "Medication Name" field of the particular document image).

As indicated in FIG. 19, the boundaries of the ROI may be determined independently of any visible boundaries (e.g., lines) around the ROI. Similarly, ROIs may be determined for document images that do not include boundaries around particular ROIs. For example, the document shown in FIG. 20A (e.g., a check) may be analyzed to identify an ROI corresponding to the "Pay" field. In the illustrated embodiment, the location of the "Pay" FOI is identified, as well as the location of bottom and left neighbors ("to" and "$" respectively). Based on the identified locations of these FOIs, as well as formatting data indicating the location of the ROI relative to the corresponding "Pay" FOI, the analytic computing entity 65 is configured to draw a boundary around the ROI having edges corresponding to: a left edge that is colinear or otherwise aligned with the right edge of the corresponding FOI, a bottom edge that is colinear or otherwise aligned with the top edge of the bottom neighbor (i.e., "to" in the illustrated embodiment of FIGS. 20A-20B), a right edge that is colinear or otherwise aligned with the left edge of the right neighbor (i.e., "$" in the illustrated embodiment), and a top edge that is a defined distance away from the bottom edge (corresponding to a defined (e.g., automatically defined or manually defined) height of the ROI. It should be understood that similar limitations may be provided for the right edge of an ROI (e.g., a length of the ROI may be defined based on manually or automatically defined data indicating a length of the ROI). As yet other examples, the edges of a particular ROI may be defined to be colinear or otherwise aligned with an edge of a document image (e.g., an ROI may extend to a right edge of a document image in instances where no right neighbor is located; or an ROI may extend to a bottom edge of a document image in instances where no bottom neighbor is located).

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for extracting textual data within a field-of-interest from an image, the method comprising:
   identifying, within each of a plurality of images, one or more connected components;
   identifying target text for extraction from the plurality of images;
   extracting text from a first plurality of connected components comprising at least one of the one or more connected components identified within each of the plurality of images via optical character recognition (OCR) as matching the identified target text for extraction;
   generating a vector representation of each of the connected components identified within the plurality of images;
   identifying, based on a vector representation comparison between the one or more connected components identified within each of the plurality of images, a second plurality of connected components within one or more of the plurality of images, wherein the second plurality of connected components have a vector representation matching a vector representation of at least one of the first plurality of connected components; and
   extracting, via OCR, text from the second plurality of connected components.

2. The computer-implemented method of claim 1, further comprising:
   training an object detection model with the first plurality of connected components and the second plurality of connected components;
   identifying, via the object detection model, a plurality of fields matching at least one of the first plurality of connected components or the second plurality of connected components; and
   extracting text from the plurality of fields based at least in part on matches with the at least one of the first plurality of connected components or the second plurality of connected components.

3. The computer-implemented method of claim 2, wherein training an object detection model comprises supervised training.

4. The computer-implemented method of claim 1, wherein identifying a match between a vector representation of the second plurality of connected components with a vector representation of the first plurality of connected components comprises:
   determining a correlation between the vector representation of the first plurality of connected components and others of the one or more connected components identified within the plurality of images; and
   identifying the second plurality of connected components based on a determination that the vector representation of the second plurality of connected components satisfies a correlation criterion with the first plurality of connected components.

5. The computer-implemented method of claim 4, further comprising:
   identifying a region of interest having corresponding connected components having extracted text corresponding to the one or more field names; and
   extracting image data corresponding to the region of interest.

6. The computer-implemented method of claim 1, further comprising:
   comparing the extracted text against one or more field names of a field-of-interest; and
   identifying one or more connected components having extracted text corresponding to the one or more field names.

7. A computing system comprising a non-transitory computer readable storage medium and one or more processors, the computing system configured to:
   identify, within each of a plurality of images, one or more connected components;
   identify target text for extraction from the plurality of images;
   extract text from a first plurality of connected components comprising at least one of the one or more connected components identified within each of the plurality of images via optical character recognition (OCR) as matching the identified target text for extraction;
   generate a vector representation of each of the connected components identified within the plurality of images;
   identify, based on a vector representation comparison between the one or more connected components identified within each of the plurality of images, a second plurality of connected components within one or more of the plurality of images, wherein the second plurality of connected components have a vector representation matching a vector representation of at least one of the first plurality of connected components; and
   extract, via OCR, text from the second plurality of connected components.

8. The computing system of claim 7, wherein the computing system is further configured to:
   train an object detection model with the first plurality of connected components and the second plurality of connected components;
   identify, via the object detection model, a plurality of fields matching at least one of the first plurality of connected components or the second plurality of connected components; and
   extract text from the plurality of fields based at least in part on matches with the at least one of the first plurality of connected components or the second plurality of connected components.

9. The computing system of claim 8, wherein training an object detection model comprises supervised training.

10. The computing system of claim 7, wherein identifying a match between a vector representation of the second plurality of connected components with a vector representation of the first plurality of connected components comprises:

determining a correlation between the vector representation of the first plurality of connected components and others of the one or more connected components identified within the plurality of images; and identifying the second plurality of connected components based on a determination that the vector representation of the second plurality of connected components satisfies a correlation criterion with the first plurality of connected components.

11. The computing system of claim 10, wherein the computing system is further configured to:

identify a region of interest having corresponding connected components having extracted text corresponding to the one or more field names; and extract image data corresponding to the region of interest.

12. The computing system of claim 7, wherein the computing system is further configured to:

compare the matching text against one or more field names of a field-of-interest; and identify one or more connected components having matching text corresponding to the one or more field names.

13. A computer program product comprising a non-transitory computer readable medium having computer program instructions stored therein, the computer program instructions when executed by a processor, cause the processor to:

identify, within each of a plurality of images, one or more connected components;

identify target text for extraction from the plurality of images;

extract text from a first plurality of connected components comprising at least one of the one or more connected components identified within each of the plurality of images via optical character recognition (OCR) as matching the identified target text for extraction;

generate a vector representation of each of the connected components identified within the plurality of images;

identify, based on a vector representation comparison between the one or more connected components identified within each of the plurality of images, a second plurality of connected components within one or more of the plurality of images, wherein the second plurality of connected components have a vector representation matching a vector representation of at least one of the first plurality of connected components; and extract, via OCR, text from the second plurality of connected components.

14. The computer program product of claim 13, further configured to cause the processor to:

train an object detection model with the first plurality of connected components and the second plurality of connected components;

identify, via the object detection model, a plurality of fields matching at least one of the first plurality of connected components or the second plurality of connected components; and extract text from the plurality of fields based at least in part on matches with the at least one of the first plurality of connected components or the second plurality of connected components.

15. The computer program product of claim 14, wherein training an object detection model comprises supervised training.

16. The computer program product of claim 13, wherein identifying a match between a vector representation of the second plurality of connected components with a vector representation of the first plurality of connected components comprises:

determining a correlation between the vector representation of the first plurality of connected components and others of the one or more connected components identified within the plurality of images; and identifying the second plurality of connected components based on a determination that the vector representation of the second plurality of connected components satisfies a correlation criterion with the first plurality of connected components.

17. The computer program product of claim 16, further configured to cause the processor to:

identify a region of interest having corresponding connected components having matching text corresponding to the one or more field names; and extract image data corresponding to the region of interest.

18. The computer program product of claim 13, further configured to cause the processor to:

compare the matching text against one or more field names of a field-of-interest; and identify one or more connected components having matching text corresponding to the one or more field names.

* * * * *